May 26, 1931. C. W. EBELING 1,806,617
SYNCHRONIZED PHOTOGRAPHIC AND SOUND RECORDING AND REPRODUCING MECHANISM
Filed Dec. 13, 1927 5 Sheets-Sheet 1
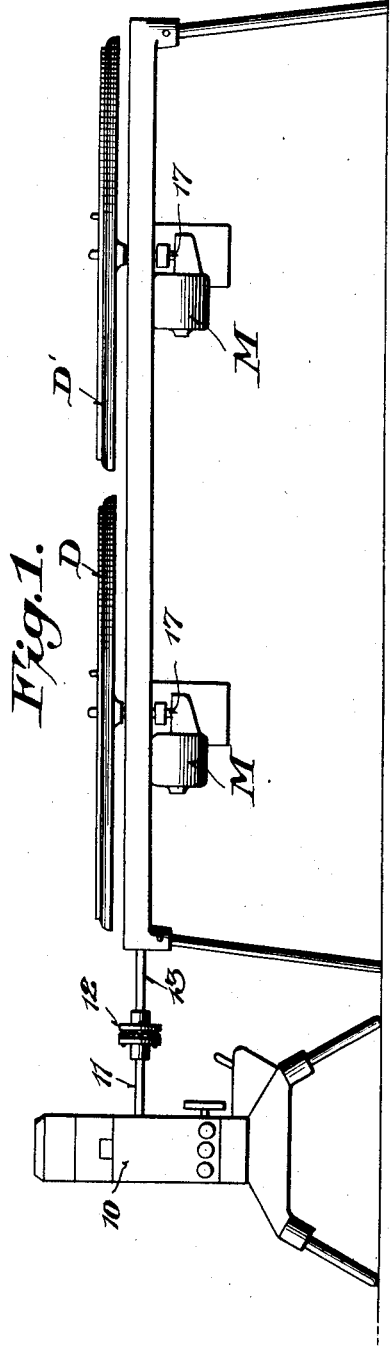
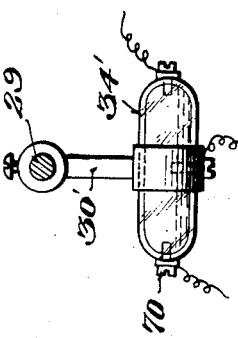
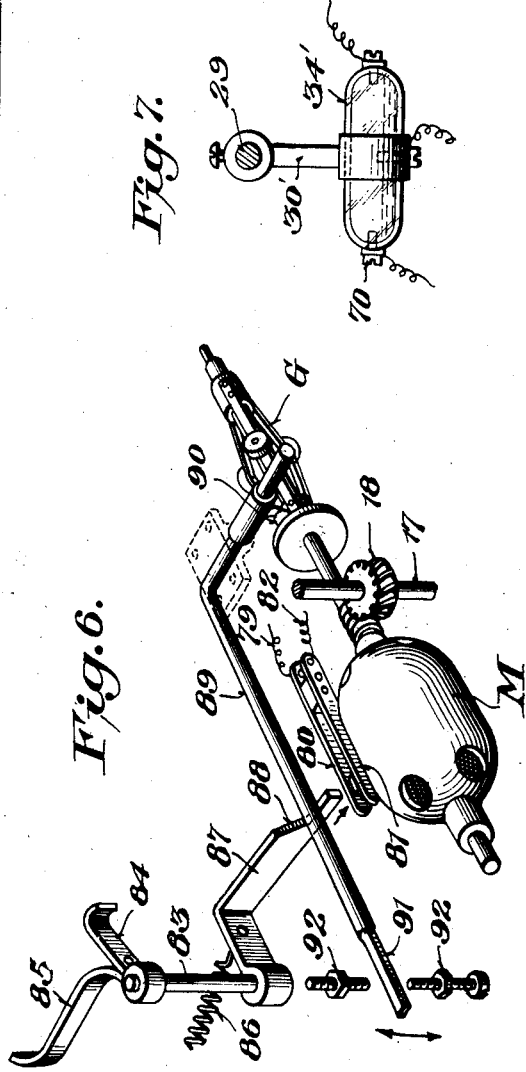
Inventor
Charles W. Ebeling,
By
Attorney

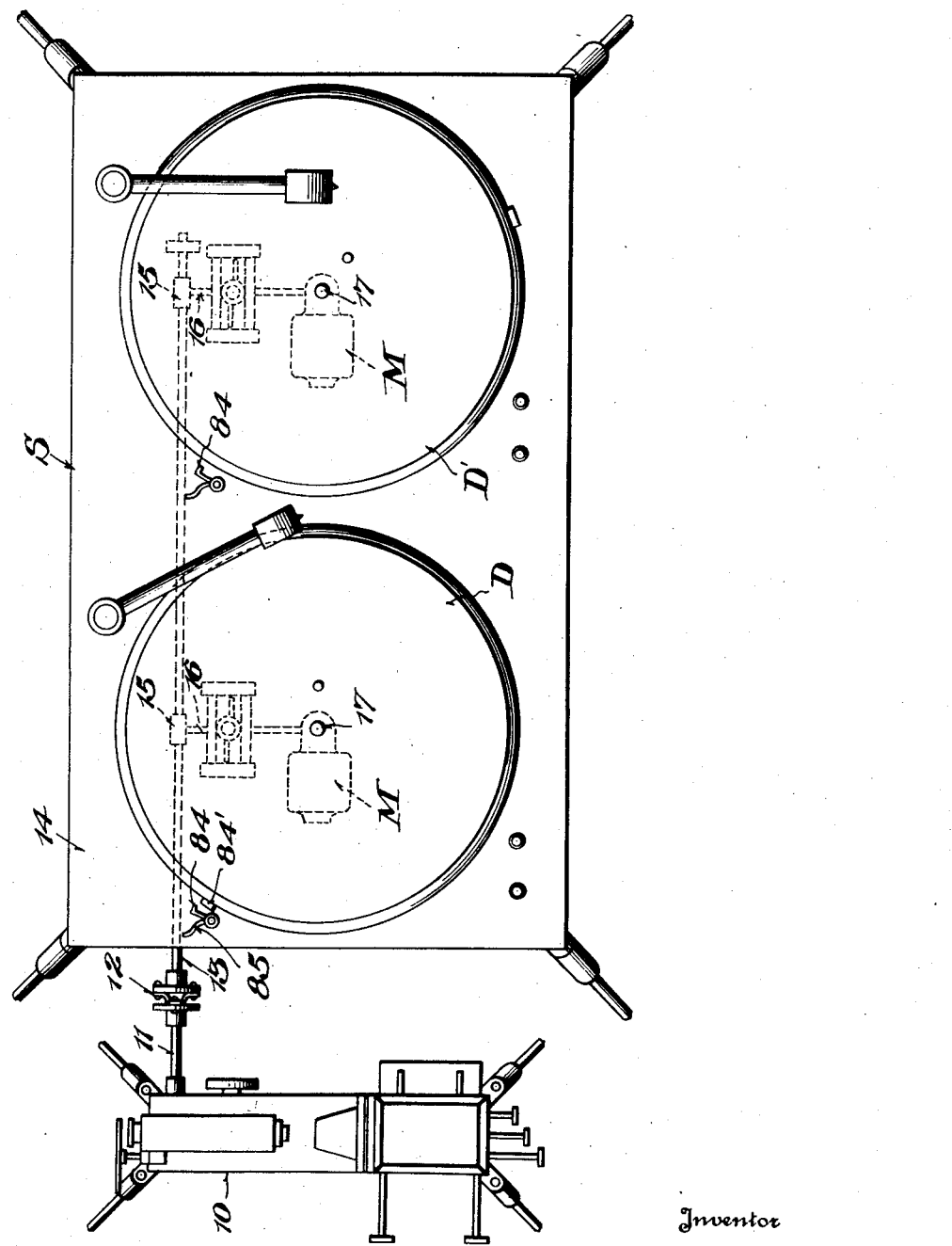

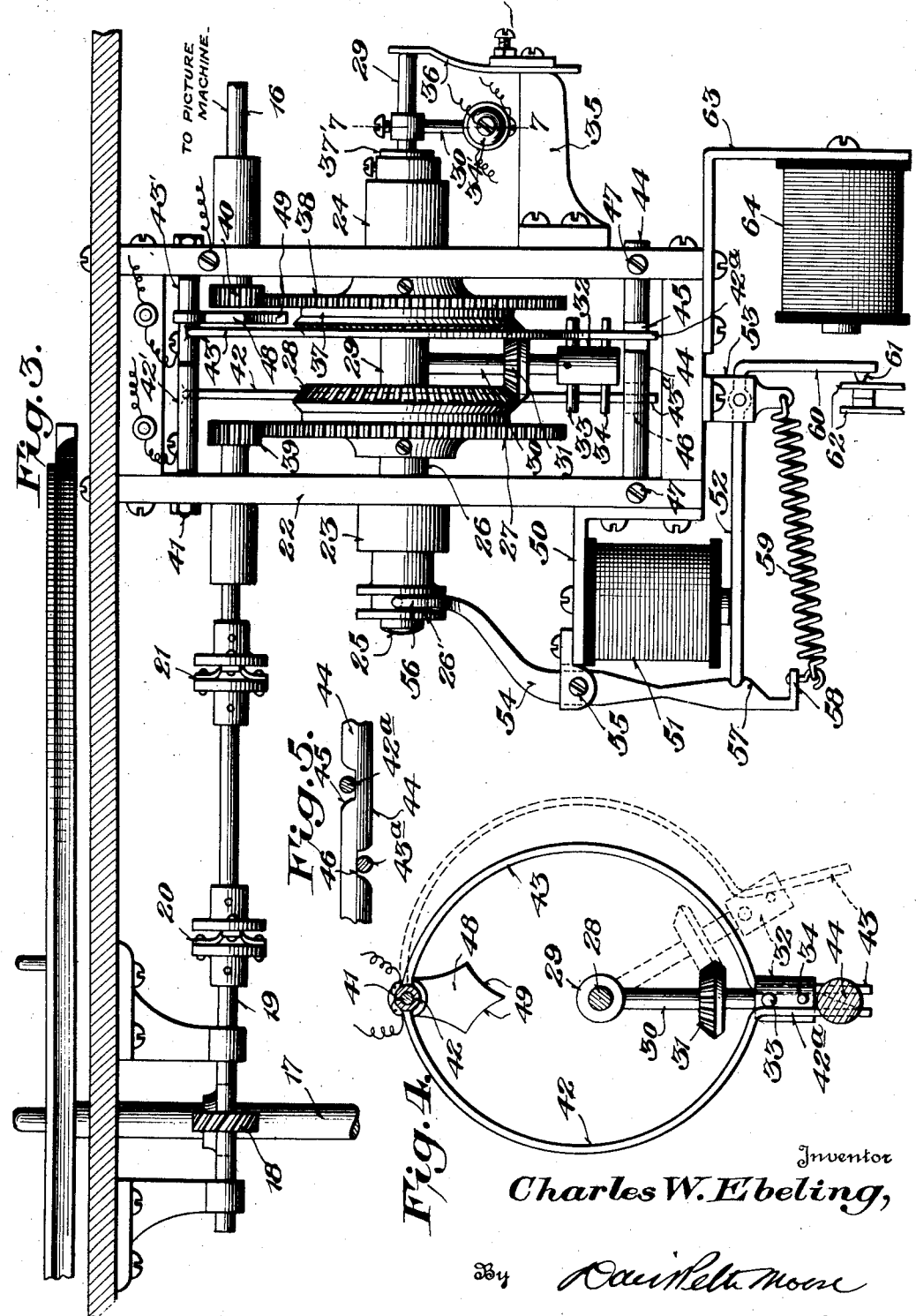

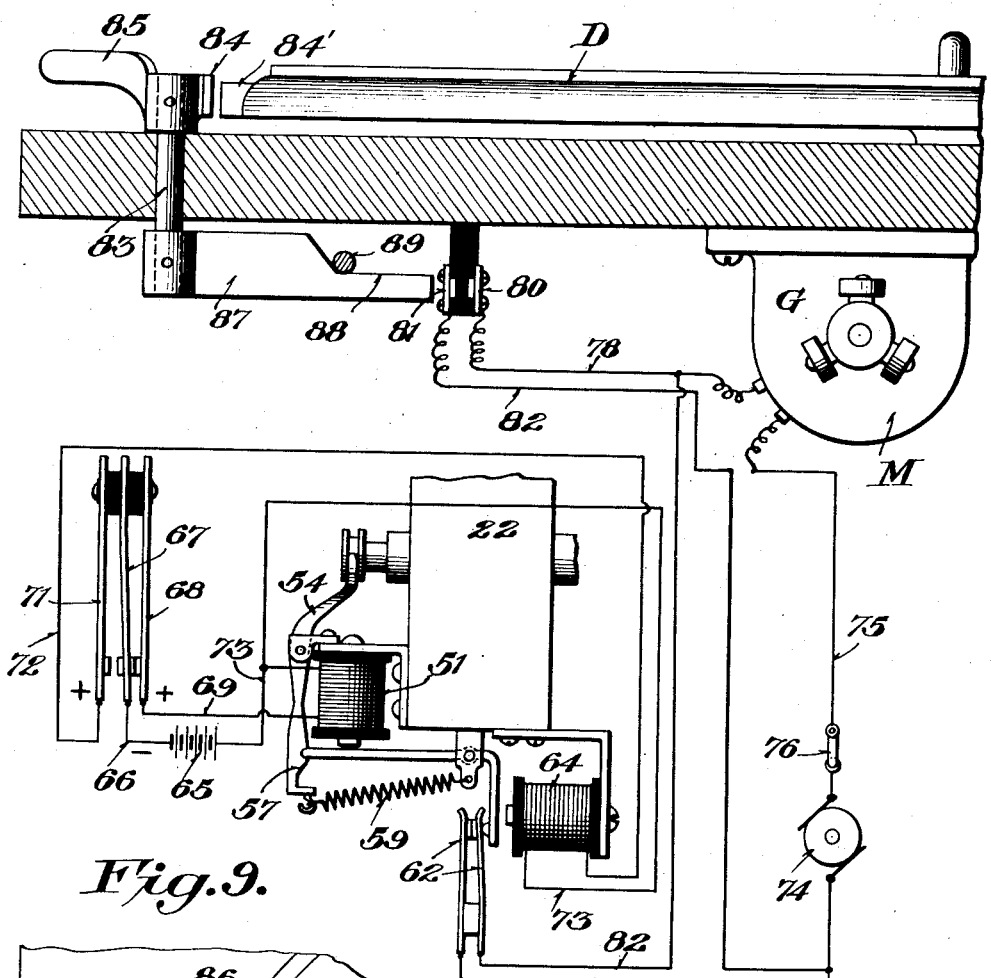
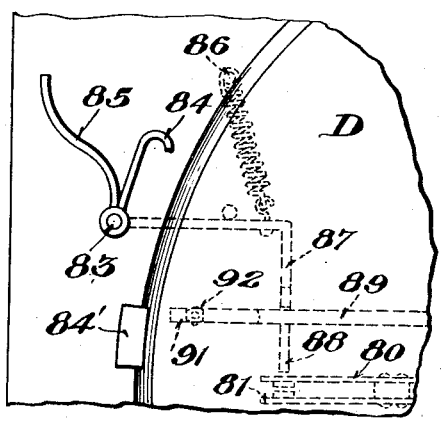

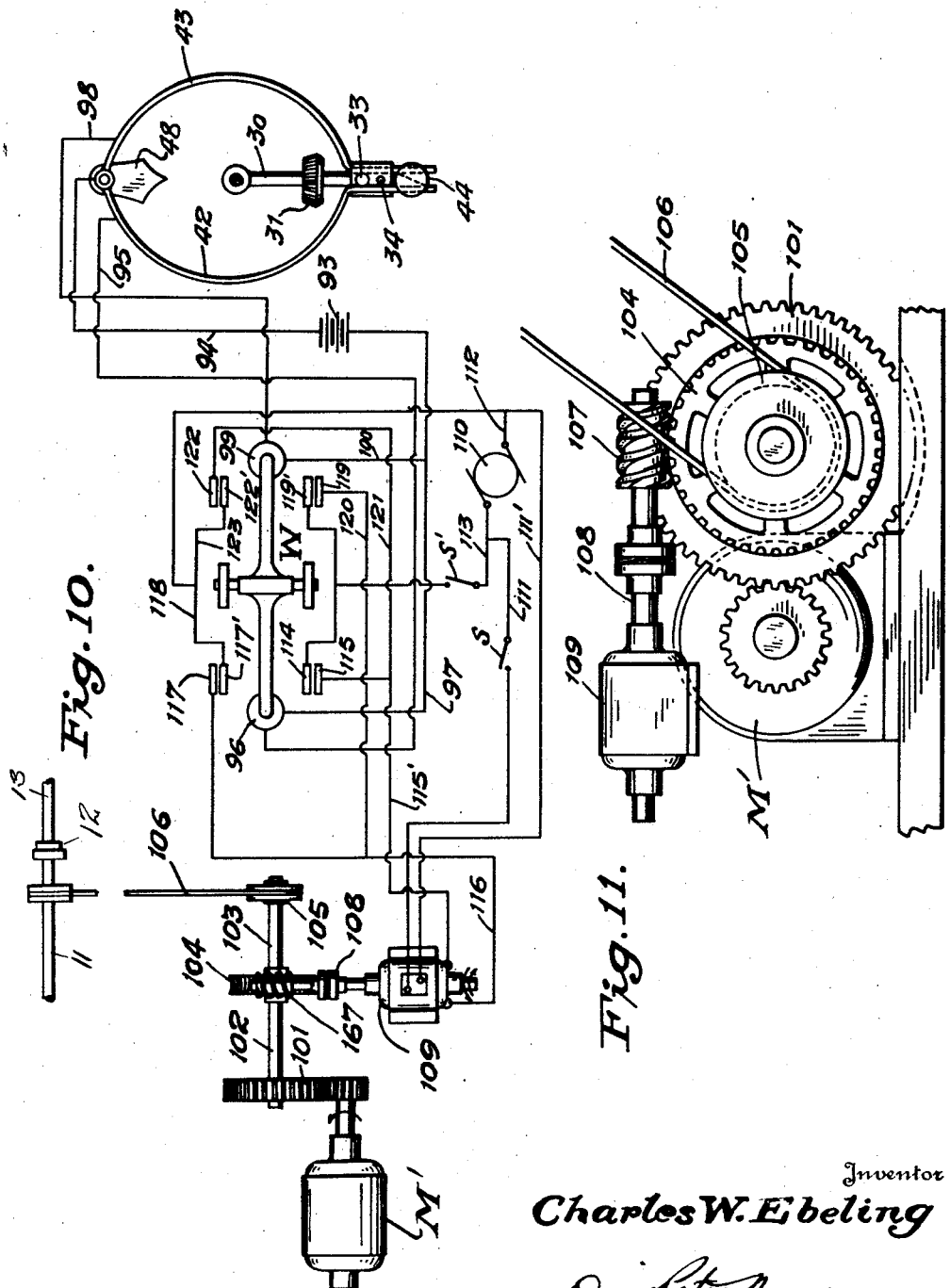

Patented May 26, 1931

1,806,617

UNITED STATES PATENT OFFICE

CHARLES W. EBELING, OF NEW YORK, N. Y., ASSIGNOR TO HARRISON W. ROGERS, INCORPORATED, A CORPORATION OF DELAWARE

SYNCHRONIZED PHOTOGRAPHIC AND SOUND RECORDING AND REPRODUCING MECHANISM

Application filed December 13, 1927. Serial No. 239,676.

This invention relates to improvements in synchronized photograph and sound recording and reproducing mechanisms, one object of the invention being the provision of a mechanism adapted to be interposed between a motor actuated photographic machine, either a camera or a moving picture projector, and a sound recorder or reproducer, and whereby either one of said mechanisms is kept in proper step or synchronism with the other, and whereby either one of said machines controls the other.

Another object of this invention is the provision of a synchronized "talking picture" mechanism, wherein the present type of motion picture projector and a single or double talking machine may be utilized, without the necessity of reconstructing either or both of these machines, as is the case with the complicated and costly mechanisms now in use and which are designed to use a disk sound record and projector coupled together, or where the sound is recorded on the film and a photo-electric device or cell with specially constructed projector machine is used.

Still another object of this invention is the provision of a very simple and compact mechanism adapted to be disposed between the motor driven motion picture projector and a motor driven sound reproducing machine, with means controlled by the motor of the sound reproducing machine for speeding up or slowing down the drive transmission between the motor and its projector, such latter means being preferably electric.

To more clearly understand the invention attention is invited to the accompanying drawings, in which:—

Figure 1 is a view in elevation of the complete mechanism, the motion picture projector being merely in diagram and its motor housed and not shown.

Figure 2 is a top plan view thereof.

Figure 3 is an enlarged detail and sectional view of a portion of a sound reproducing machine and one synchronizer.

Figures 4 and 5 are detail views of the synchronizer switch and adjacent portions thereto.

Figure 6 is a detail detached perspective view of the platform stop and release and motor circuit closing switch for the sound reproducing machine.

Figure 7 is a detail view of the mercury switch actuated by the synchronizer and which can be substituted for the one shown in Figure 4.

Figure 8 is a sectional view through the sound reproducing machine platform showing the device illustrated in Figure 6, the circuits associated therewith being shown in diagram.

Figure 9 is a top plan view of a portion of the sound reproducing machine showing the mechanism of Figure 6 in place.

Figure 10 is a view in diagram of the circuits for controlling the speed of the motion picture projector, and which are primarily controlled by the synchronizer.

Figure 11 is a side elevation of the motor for operating the motion picture projector and the speed controller therefor.

Referring to the drawings the numeral 10 designates the motion picture projector having the operating motor M', which in turn, as shown in Figure 10, operates the gearing 101, and the two aligned shafts 102 and 103, which are connected together by the differential gearing 104, and through the pulley 105 and belt 106 (Figure 10) drive the shaft 11, which in turn is connected to the shaft 13, through the flexible sound deadening universal joint 12.

The shaft 13 is journaled below the base plate 14 of the sound reproducing machine S and carries the gearing 15, one to each sound tablet receiving platform or turntable D—D' and thus drives the respective short shafts 16.

There is one synchronizer to each platform, and each one comprises a frame 22 which is suspended from its platform 14, so that the vertical platform driving shaft 17, may be connected through gearing 18 and the sectional shaft 19 with its universal sound deadening joints 20 and 21, to the synchronizer at the opposite side and aligned with the shaft 16.

The bearings 23 and 24 support the sliding and rotatable shaft 25 and also the slidable and rotatable shaft 26, the latter being mounted for rotation upon the former, while the shaft 25 is extended through the bearing 24 and the rotatable sleeve 37, and has the reduced extension 29, the purpose of which will presently appear. Rotatable with the shaft 26 is a large gear 27 and the bevel gear 28, which as shown in Figure 3 is capable of being slid to the left and out of gear with the small gear 31, this being done by the spool 26' and the yoke 56, as will presently appear. The portion 29' is free on the shaft 25 and carries the arm 30, which in turn has the gear 31 rotatably mounted thereon and adapted to be moved to the left after the gear 28 has been moved to the left, and consequentially out of mesh with the bevel gear 37, which in turn is fast with the gear 38, and rotatable on the shaft 37'. This gear has no lateral movement, while both gears 28 and 31 have, the spring 36 imparting the movement to the latter, this spring being supported by the bracket 35.

The gear 39 carried by the shaft 19 is in gear at all times with the gear 27 while the gear 40 is in gear with the gear 38, and is fast to the shaft 16. Thus the two wheels are independently rotated by the respective sound reproducing and projector mechanisms.

Mounted upon and insulated from the rod 41 are two sleeves 42' and 43', which carry respectively the arcuate depending or pendant arms 42 and 43, and these arms constitute with the terminal 34, the switch for controlling the mechanism, the pin 33 of insulation, carried by the weight 32 of the swinging arm 30 normally engaging the flat terminals 42ª and 43ª and holding the circuit open at this point, this holding action being accomplished by the fibre insulating rod 44, mounted oscillatably adjustably in the frame by set screws 47, and provided with notches 45 and 46, as shown in Figure 5, to receive said terminals.

By this arrangement when the parts are in the position shown in Figure 3, both machines being in operation, there is thus formed with the gears 28, 37 and 31 a differential gearing and the parts will assume the position as shown in Figure 4, but should the speed of the shaft 19 vary, the arm 30 will be moved out of the vertical and as soon as the contact 34 engages either terminal 43ª or 42ª, a circuit will be closed, to in turn regulate the speed of the shaft 16, as will presently appear.

Should the arm 30 due to high speed or otherwise be carried upwardly in either direction until it engages the pendant weight 48, by means of the pin 33 riding on the curved portion 49, the pendant will exert a pressure to halt the arm 30 and start it in the reverse direction, while the weight 32 normally returns the arm to its lowest position.

In order to move the gears into the position as shown in Figure 3 and also to separate them when desired, the bracket 50 supports the magnet 51, which as will presently appear attracts the L-shaped armature 52, and causes its free end to ride on the lug catch 57 of the lever 54, to cause the yoke 56 to push inwardly the shaft 26, its gears 27 and 28 and in turn the sleeve 29' and the arm 30, whose gear 31 is then placed in mesh with both gears 28 and 37. This is done when the sound reproducing turntable is operated and connected with the differential gearing to in turn control the operation of the motion picture machine which was previously started. The armature controlled lever 54 is pivoted at 55 to the bracket 50. The lower end of the lever 54 at 58 is connected to the tractile spring 59, which when the electromagnet 64, supported in the bracket 63, is energized, and attracts the armature 52 to release the lever 54, pulls the lever 54 to slide the shaft 26 and the gears 27 and 28 to the left, while the spring 36 moves the shafts 29 and 25 and consequently the arm 30 and its gear 31 far enough to the left to free the gear 31 from the gear 37 and not into engagement with the gear 28. Thus when the above action takes place, both gears 28 and 37 are free to be rotated separately and without effecting any movement in the arm 30.

When the armature lever 52 was attracted by the magnet 51 and moved to the position as shown in Figure 3, the point 61 engaged and closed the switch contacts 62, and by reference to Figure 8, the circuit controlled thereby will be seen, as are also the circuits for actuating the magnets 51 and 64.

The circuit for energizing the magnet 51, includes the battery 65, the conductor 66, the contact 67, which is controlled by the film of the projector by any desired film actuated mechanism, or as shown in Rogers U. S. Patent No. 1,254,436, dated Jan. 22, 1918, the contact 68, the conductors 69, the magnet 51, the conductor 73. At the same time as this switch was momentarily closed and the magnet 51 energized, the switch 62 was closed, and is held closed, until the magnet 64 is energized. The circuit to the magnet 64 is as follows, the battery 65, the conductor 66, the contact 67, the contact 71, the conductor 72, the magnet 64, and the conductor 73.

The circuit to the sound reproducing machine motor M, has two switches to insure its energization, the automatic switch 62, and the manually controlled switch consisting of the contacts 80 and 81; and one circuit to said motor includes the source of electrical energy 74, the conductor 75, having the main switch 76, the motor M, the conductor 78, the contacts 80 and 81, and the conductor 82.

The mechanism for operating the switch 80—81, consists of a shaft 83 mounted in the base plate, and having the V-shaped member with the hooked terminal 84 and the operating handle 85, the hooked terminal 84 being in the path to engage the stop lug 84', carried by the platform D, so as to halt the platform or turntable and hold it in starting position. Upon the lower end of the shaft 83 is the L-shaped arm 87 having the cam end 88, disposed in the path to engage and elevate or lower the lever 89, having the brake shoe 90 in the path to engage the governor disk of the governor mechanism G, while the reduced end 91 of the lever 89 is disposed for movement between the adjustable stops 92 carried by the base plate 14.

Thus should the platform D—D' halt without the stop 84' being in position to engage the hook 84, the operator pushes the arm 85 against the spring 86, to cause the switch 80—81 to close and the brake 90 to release, placing the hook in the path to engage the stop 84', at which time the handle 85 is released to permit the contacts to open and the brake to be applied. This is very important after the removal of a sound record that has been played and after the placing of a new record on the turntable, as it insures the proper positioning of the phonic groove to receive the stylus.

As shown in Figures 3 and 7, a mercury switch is shown, and this is to be substituted in place of the contact 34, and the arms 42 and 43, the latter arms in this event merely being used to steady the movement of the arm 30 and the mercury switch. The tube 34' is in this instance carried by an arm 30', attached to and depending from the reduced end 29 of the shaft 25.

The circuits controlled by the synchronizer actuated switches are shown in Figure 10, and include when the arm 42 is engaged by the contact 34, the battery 93, the conductor 94, the frame 22, the contact 34, the arm 42, the conductor 95, attached to the arm 42, the coil 96 of the pole changing switch W, and the conductor 97. When the contact 34 engages the arm 43, the circuit closed is as follows:—the battery 93, the conductor 94, the frame 22 of the synchronizer, the contact 34, the arm 43, insulated from the frame 22, the conductor 98, the coil 99 of the pole changing switch W, and the conductors 100 and 97.

When the coil 96 was energized, the contacts 114—115, and 117 and 117' were closed, and the following circuit was closed, and included the source of electrical energy 110, the conductor 113, the switch s', contacts 114—115, conductor 115', reversible motor 109, conductor 116, contacts 117—117', and conductors 118 and 112. This caused the motor to rotate in one direction, while the circuit to cause the motor 109 to move in the reverse direction includes the source of electrical energy 110, the conductor 113, the switch s', the contacts 119—119', the conductors 120 and 116, the motor 109, the conductor 115', the conductor 121, and the contacts 122—122', and the conductors 123, 118 and 112.

Through this medium the motor operates the shaft 108 and the worm 107 so that the main ring gear of the differential gearing 104 is moved in one of two directions, which causes an acceleration of the speed to the shaft 103 or a retardation thereto, and in accordance with the speed of the motor M of the sound reproducing machine, without in any way effecting the speed of the motor M'. The field of the motor 109 is energized from the source 110 through conductors 111 with switch s, and conductors 111' and 112.

From the foregoing description taken in connection with the drawings, it is evident that this synchronizer after having been started by the film switch, will so affect the pole changing switch W, as to keep the motion picture projector in step or synchronized with the sound reproducing machine, and that the film controlled switch will control the cutting in and out of the synchronizer.

What I claim as new is:—

1. In a device of the character described, the combination with two machines, an independent electric motor for each machine, means controlled by one machine for setting in motion the motor of the second machine, and a differential gearing interposed between both motors to be driven simultaneously thereby, of a pole changing switch, a reversible motor controlled by said switch, a second differential gearing interposed between the motor of one machine and the machine operated thereby and under the control of the reversible motor, two pendant switches operated by the first differential gearing and in circuit with the reversible motor, and means for returning said pendant switches to normal position should either one be carried beyond its normal zone.

2. A differential gearing switch controller including a frame, a shaft journaled therein, an arm carrying a gear fast to said shaft, a double gear mounted rotatably upon said shaft with one of its gears in mesh with the arm carried gear, a second double gear slidable longitudinally and rotatable upon the first shaft, means for independently operating each double gear, a spring for normally holding the second gear out of mesh with the arm carried double gear, and an electromagnet for sliding the last double gear in opposition to the spring to force the gears in engagement with the arm carried gear.

3. A differential gearing switch controller according to claim 2, in which a switch is controlled by the shaft.

4. A differential gearing switch controller according to claim 2, in which two switches are controlled by the shaft, one when the arm is moved in one direction and the other when the arm is moved in the opposite direction.

5. A differential gearing switch controller including a frame, two independent drive shafts journaled therein at opposite sides, an oscillatable shaft journaled in the frame, an arm carried thereby, a gear carried by the arm, two sets of gears mounted for rotation on said shaft and operated from the drive shafts respectively, a gear carried by one of said sets of gears and in mesh at all times with the arm carried gear, one of the gears of the remaining set being slidable longitudinally upon the driven shaft, a gear carried thereby, a spring normally holding the latter gear out of mesh with the arm carried gear, and electric means for moving the gear in opposition to the spring to cause it to mesh with the arm carried gear.

6. A differential gearing switch controller according to claim 5, in which a lock for said longitudinally slidable gear, and electric means for releasing the lock is provided, the first electric means permitting the lock to engage when the gears are placed in mesh.

7. A differential gearing synchronizer according to claim 5, in which two switches are controlled by the oscillatable shaft.

In testimony whereof, I have hereunto set my hand.

CHARLES W. EBELING.